April 16, 1957 M. R. CINES 2,789,087
SEPARATION OF CYCLIC AND ACYCLIC HYDROCARBONS
WITH PERFLUOROCARBONS
Filed Dec. 20, 1950
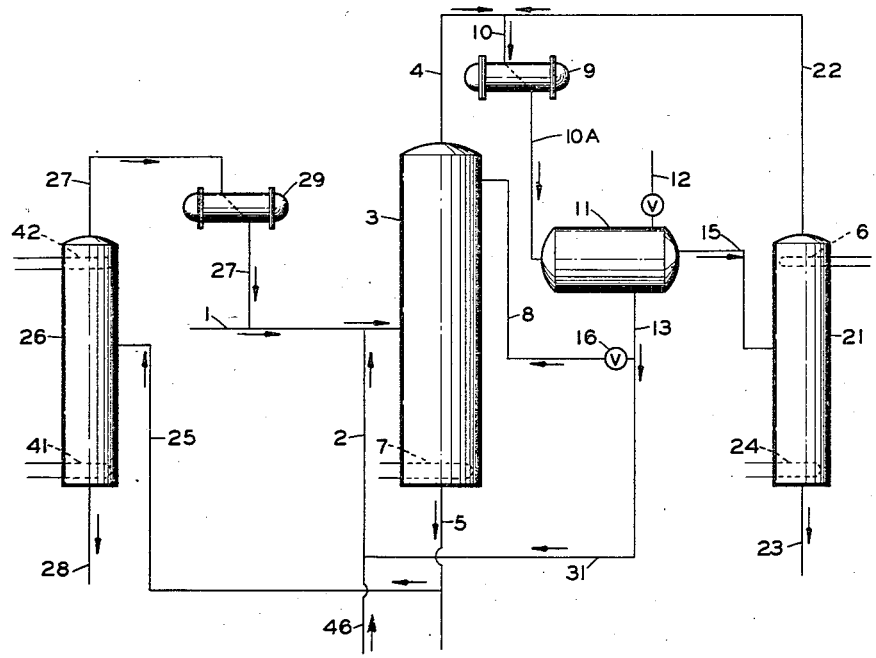
INVENTOR.
M. R. CINES
BY *Hudson & Young*
ATTORNEYS

United States Patent Office 2,789,087
Patented Apr. 16, 1957

2,789,087

SEPARATION OF CYCLIC AND ACYCLIC HYDROCARBONS WITH PERFLUOROCARBONS

Martin R. Cines, Bartlesville, Okla., assignor to Phillips Petroleum Company, a corporation of Delaware Application December 20, 1950, Serial No. 201,843

11 Claims. (Cl. 202—42)

This invention relates to the separation of cyclic and acyclic hydrocarbons by means of distillation. In one aspect, it relates to a process for the separation of cyclic hydrocarbons from acyclic hydrocarbons by azeotrope distillation with perfluoro compounds as entrainers. In another aspect, it relates to a process for separating cyclic hydrocarbons from acyclic hydrocarbons of seven and more carbon atoms per molecule by azeotropic distillation with perfluoro compounds as entrainers.

The separation of volatile compounds by azeotropic distillation is well known and is practiced to effect separations which are difficult or even impossible by ordinary distillation methods. The mixtures of volatile compounds which can be separated in many instances have such volatility characteristics that ordinary distillation yields only one component of acceptable purity, and in some instances substantially no separation at all is effected. This difficulty in effecting separation by fractional distillation may be due to the formation of constant boiling mixtures or azeotropes or it may be that the boiling points of the components are so close together that columns of a practical number of plates are ineffective. In order to separate such mixtures, solvent extraction or azeotropic distillation processes may be used. In the process of azeotropic distillation, an additional volatile component is added which so alters the volatilities of the original constituents that satisfactory separation in a fractionating column of practical size becomes possible. In order for the azeotropic distillation to be useful, separation and recovery of the entrainer from the products must be possible. Most azeotropes, as is well known, are of the low boiling or minimum boiling point type, although some high boiling or maximum boiling point ones are known. In this type of distillation, the entrainer is added to the system, and it preferentially azeotropes with one or more of the components, during the distillation. The azeotrope of the entrainer with one or more components of the mixture which are desired to be separated has a greater volatility than the remaining component or components and/or azeotropes thereof. Upon separation of the entrainer from the azeotropic mixture by any of various known means, the separation of the original mixture has been effected. In case any entrainer remains in solution in the still bottoms, it may be separated therefrom to complete the separation and recovery process. Normally, however, the amount of entrainer employed is adjusted so that substantially all is taken overhead and the kettle product is substantially entrainer-free.

One object of my invention is to provide a process for the separation of cyclic hydrocarbons from acyclic hydrocarbons.

Another object of my invention is to provide a process for the separation of a narrow boiling range mixture of cyclic and acyclic hydrocarbons into cyclic hydrocarbons and acyclic hydrocarbons.

Still another object of my invention is to provide a process for separating cyclic hydrocarbons from acyclic hydrocarbons having substantially the same boiling points.

Still other objects and advantages of my process will be realized upon reading the following disclosure which, taken with the attached drawing, forms a part of the specification.

The drawing represents, diagrammatically, one arrangement of apparatus parts in which to practice the process of my invention.

To accomplish the foregoing and related objects, I have found that narrow boiling range mixtures of cyclic and acyclic hydrocarbons may be separated by azeotropic distillation in the presence of a completely fluorinated non-acidic organic compound. My invention comprises specifically a process of separating cyclic hydrocarbons from acyclic hydrocarbons by azeotropic distillation in which the entrainer is a non-acidic and completely fluorinated organic compound, and this entrainer so alters the volatilities of the hydrocarbons that a mixture of the entrainer and hydrocarbons of one of these types is recovered from the overhead product and hydrocarbons of the other of these types is recovered from the kettle product.

Acyclic hydrocarbons of seven and more carbon atoms per molecule, when mixed with similar boiling point cyclic hydrocarbons and distilled in the presence of a non-acidic perfluoro organic compound, are removed from the distillation column in the bottoms product. The cyclic hydrocarbons appear to form the lower boiling azeotropes with the entrainers and accordingly are recovered from the overhead condensate.

By the term "perfluoro compounds" or "perfluoro organic compounds" as used throughout this specification and claims, I refer to completely fluorinated organic compounds. By completely fluorinated organic compounds, it is meant that all of the hydrogen atoms of the organic compounds which are directly bonded to carbon atoms are replaced by fluorine atoms. For example, a seven carbon atom straight chain compound in terms of hydrocarbons is called normal heptane. When all of the hydrogens of this normal heptane hydrocarbon are replaced by fluorine atoms, the compound may be termed perfluoro-n-heptane. The paraffin compounds, in general, when completely fluorinated, may be termed "perfluoro paraffins." When cyclic paraffins are completely fluorinated, they may be termed perfluoro cycloparaffins, an example of which is perfluorocyclohexane. Dialkyl ethers, such as dibutyl ether, may be completely fluorinated to form perfluoro di-n-butyl ether. Substituted ammonia or amino compounds, such as mono-, di-, or trialkyl amines may be completely fluorinated as, for example, perfluoro-tri-n-butyl amine, tripropylamine, etc. All of these completely fluorinated organic compounds are non-acidic compounds as contemplated herein. By such terms as completely fluorinated organic compounds or perfluoro organic compounds as used in this specification and claims, non-acidic compounds are contemplated. Some of the aforementioned perfluoro compounds and their corresponding normal boiling points in degrees Fahrenheit are as follows:

|  | ° F. |
|---|---|
| Perfluoromethylcyclohexane | 163–172 |
| Perfluoro-n-heptane | 181 |
| Perfluoro-di-n-butyl ether | 212 |
| Perfluoro-tripropylamine | 265 |
| Perfluoro-tri-n-butylamine | 351 |

A perfluoro compound entrainer of my invention should have a normal boiling point within about 70° F. of the normal boiling point of the hydrocarbon to be distilled overhead, and it is preferable that the perfluoro compound have a normal boiling point within about 35° F. of that of the hydrocarbon to be distilled overhead. For example, when separating cyclic from acyclic hydrocarbons in which the acyclic hydrocarbons have seven and more carbon atoms per molecule, the perfluoro entrainer should have a normal boiling point within 70° F., and preferably within 35° F., of that of the cyclic hydrocarbon since the cyclic compounds pass overhead. The expression "within 70° F." or "within 35° F." is intended to mean 35° or 70° F. above as well as below the boiling point of the compound to be distilled overhead.

Distillations, according to my process, are usually carried out at pressures of about atmospheric or slightly above atmospheric as, for example, about 50 pounds per square inch gage. Higher pressures may be used if such be desirable from the standpoint of facilitating processing.

Conventional azeotropic distillation columns may be used, for example, packed columns, bubble cap columns, or perforated plate columns. As in other distillations, columns having a large number of theoretical plates will effect better separations than columns having a smaller number of theoretical plates. In some instances, satisfactory operations by my process can be effected with a column having as few as five theoretical plates, while for other separations, columns having a greater number of theoretical plates are required. The number of theoretical plates will depend, of course, upon such conditions as the hydrocarbons concerned and the degree of separation desired, as well as the particular entrainer used and the relative volatilities of the hydrocarbons in the presence of the entrainer.

In my process, separation of the azeotropic mixture of cyclic hydrocarbon and entrainer is readily effected. Upon condensation of the azeotrope vapor and cooling, two liquid phases are formed. The lighter phase is hydrocarbon in which some perfluoro compound is ordinarily dissolved and the heavier phase is largely perfluoro compound having some hydrocarbon in solution. The heavier phase may ordinarily be directly recycled to the azeotropic distillation column as entrainer with the feed stock. The hydrocarbon phase having some entrainer in solution upon distillation is freed from entrainer and is removed from the kettle section of the column as a separated product of the process.

The drawing represents diagrammatically one form of apparatus in which the process of my invention may be practiced.

The apparatus consists essentially of an azeotropic distillation column 3, a hydrocarbon recovery column 21 and an entrainer or perfluoro compound recovery column 26. The columns 3 and 26 are more or less conventional distillation columns having provision for addition of reboiling heat and provision for cooling the top of the columns as by return of liquid into column 3 through pipe 8 and through closed reflux coils 42 in column 26. The column 21 may be a distillation column with reboiler coil 24 and reflux coil 6 or even under certain conditions it may be a stripping column. As mentioned hereinbefore, these columns may be bubble cap columns, packed columns or perforated columns, as desired.

As an example of the operation of the process of my invention, a narrow boiling range charge stock containing acyclic hydrocarbons having seven and more carbon atoms per molecule and cyclic hydrocarbons from a source, not shown, is introduced through line 1 into column 3 at about a midpoint of the column. A perfluoro compound as an entrainer and having a boiling point within 70° F., or preferably within 35° F., of the boiling point of the cyclic compounds to be removed overhead, is introduced into the feed line 1 from line 2. This perfluoro compound may come from a subsequent step of the process by way of lines 31 and 2 or may come from a source, not shown, through lines 46 and 2. Line 46 is shown for charging the system with entrainer when starting operations and for adding makeup entrainer as needed. The mixture of entrainer and hydrocarbons enters the distillation column 3 at about a midpoint. Sufficient heat for effecting the distillation is added through the reboiler coil 7. Under some conditions it may be desirable to reflux this column with some of the perfluoro compound entrainer, and this refluxing may be carried out by passing some perfluoro compound from a subsequent step into the column through line 8. The azeotrope containing the cyclic hydrocarbon and azeotrope former leaves the top of the column 3 through lines 4 and 10 and this vaporous material is condensed in condenser 9 with cooling of the condensate to a desired temperature. This cooled condensate passes on through line 10A into the accumulator or separator tank 11. In this separator 11, the specifically light liquid hydrocarbon phase separates as an upper phase on top of the perfluoro compound. A portion of the perfluoro compound accumulating as the lower liquid phase in vessel 11 may be passed through line 13 and line 8 containing valve 16 for refluxing the top of the column 3 as mentioned above. The remainder of the perfluoro compound is passed from line 13 on through lines 31 and 2 for recycling with the feed stock into the azeotrope column 3. The small amount of hydrocarbon in solution in the azeotrope former need not be separated when this liquid phase is recycled into the feed as mentioned.

Ordinarily some perfluoro compound remains in solution in the upper hydrocarbon layer in the separator vessel 11, and to recover the azeotrope former for recycling purposes and to recover a pure hydrocarbon product, this upper layer is passed through line 15 as charge stock into still 21. Reboiling heat is added from coil 24, and azeotrope is removed overhead from this column through line 22. The amount of azeotrope separated in this column is, of course, dependent upon the amount of azeotrope former which remains dissolved in the hydrocarbon phase in separator 11. All of this perfluoro compound is removed through line 22 as azeotrope and the vapors therefrom are combined with the azeotrope vapors from line 4 and the combined vaporous mixture passed through line 10 into the condenser 9, and the condensate is passed on through line 10A into the separator 11. Pure hydrocarbon in excess of that required to remove the perfluoro compound as azeotrope is removed from the bottom of column 21 through pipe 23 as one of the products of the process. In this case, the hydrocarbon material removed through line 23 is the cyclic hydrocarbon or hydrocarbons.

The bottoms material accumulating in the azeotropic column 3 is removed from that column through line 5 and, if sufficiently free from azeotrope former, may be withdrawn from the system as product, for subsequent disposal, as desired. If, however, too much azeotrope former has been charged to column 3, this bottoms liquid will contain the excess and this excess azeotrope former should be recovered. For this recovery operation, bottoms from column 3 are passed through lines 5 and 25 into the still 26. From this still said excess azeotrope former as azeotrope is removed through line 27. This azeotrope is condensed in condenser 29 and this condensate is added directly to the charge stock entering the main azeo column through line 1. The amount of this azeotrope from line 27 is usually small.

The several distillation columns may be operated, as regards pressure and temperature, as understood by those skilled in the distillation art.

EXAMPLE I

Separation of benzene from 2,4-dimethylpentane

A mixture of equal volumes of benzene (B. P. 176.2° F.) and 2,4-dimethylpentane (B. P. 176.9° F.) was distilled in the presence of each of three entrainers listed in the table below. These two hydrocarbons form an azeotrope containing 48.4 weight percent benzene boiling at 167.4° F. The distillation was carried out batchwise in a column equivalent to approximately 5 theoretical plates with a charge of 10 volumes of hydrocarbon and 5 volumes of entrainer.

TABLE I

| Entrainer | Head Temp., °F. | Volumes Overhead | | Vol. Percent C₆H₆, Entrainer-free | |
|---|---|---|---|---|---|
| | | Hydrocarbon | Entrainer | Kettle Product | Overhead Product |
| Perfluoromethylcyclohexane | 139 | 2.3 | 5.0 | 36 | 95 |
| Perfluoro-n-heptane | 142 | 4.5 | 5.0 | 33 | 71 |
| Perfluoro-di-n-butyl ether | 154 | 6.0 | 5.0 | 27 | 65 |

It will be seen from the above data that even with a column equivalent to very few theoretical plates, effective separation was obtained.

EXAMPLE II

*Separation of cumene from an isoparaffin fraction with perfluoro-tri-n-butylamine*

The following distillations were carried out using approximately 65 volumes of a hydrocarbon mixture consisting of 7.7 volume percent cumene (B. P. 306.3° F.) and the remainder a fraction of hydrofluoric acid paraffin alkylate boiling in the range of 300° F. to 306° F. Approximately 8 volumes of the perfluoro compound indicated was used.

TABLE II.—DISTILLATION WITH PERFLUORO-TRI-N-BUTYLAMINE

| | Cut 1 | Cut 2 | Cut 3 | Cut 4 | Kettle Product |
|---|---|---|---|---|---|
| Overhead Temp., °F | 279.8 to 282.7 | 282.7 to 284.3 | 284.3 to 287.0 | 287.0 to 299.3 | |
| Composition, volumes: | | | | | |
| Cumene | 1.3 | 1.1 | 0.9 | 0.5 | 1.3 |
| Alkylate | 3.0 | 2.6 | 3.0 | 4.9 | 45.7 |
| Entrainer | 2.7 | 2.3 | 2.1 | 1.2 | 0 |
| Vol. percent Cumene, Entrainer-free Basis | 30 | 30 | 23 | 9 | 3 |

TABLE III.—DISTILLATION WITH PERFLUOROTRIPROPYLAMINE

| | Cut 1 | Cut 2 | Kettle Product |
|---|---|---|---|
| Overhead Temp., °F | 239.3 to 248.7 | 248.7 to 296.0 | |
| Composition, volumes: | | | |
| Cumene | 1.0 | 0.2 | 3.7 |
| Alkylate | 2.1 | 1.2 | 57.3 |
| Entrainer | 7.9 | 0.6 | 0 |
| Volume percent Cumene, Entrainer-free Basis | 32 | 15 | 6 |

The above distillation was carried out under the conditions given in Example II above.

By the terms "close boiling hydrocarbons" or "narrow boiling range fractions" is meant a temperature spread of 0° up to at least 25° F. between the highest boiling and the lowest boiling constituents of the fraction or mixture of hydrocarbons. Included within this conception is such a condition as two hydrocarbon compounds having different boiling points but upon distillation of a mixture of the two hydrocarbons both are present in the distillate and appear to boil at the same temperature.

The above described flow diagram and process descriptions are given for illustrative purposes and should not be considered as limiting the invention, the scope of which is set forth in the following claims.

Having described my invention, I claim:

1. A method for separating cumene from a paraffinic alkylate comprising subjecting a fraction of a paraffinic alkylate boiling from 300° to 306° F. and containing cumene to distillation conditions in the presence of perfluoro-tri-n-butylamine, recovering cumene from the distillate and the paraffinic alkylate from the bottoms.

2. A method for separating cumene from a paraffinic alkylate comprising subjecting a fraction of a paraffinic alkylate boiling from 300° to 306° F. and containing cumene to distillation conditions in the presence of perfluorotripropylamine, recovering cumene from the distillate and the paraffinic alkylate from the bottoms.

3. A method for separating benzene from 2,4-dimethylpentane comprising subjecting a mixture of benzene and 2,4-dimethylpentane to distillation conditions in the presence of perfluoromethylcyclohexane, recovering benzene from the distillate and 2,4-dimethylpentane from the bottoms.

4. A method for separating benzene from 2,4-dimethylpentane comprising subjecting a mixture of benzene and 2,4-dimethylpentane to distillation conditions in the presence of perfluoro-n-heptane, recovering benzene from the distillate and 2,4-dimethylpentane from the bottoms.

5. A method for separating benzene from 2,4-dimethylpentane comprising subjecting a mixture of benzene and 2,4-dimethylpentane to distillation conditions in the presence of perfluoro-di-n-butyl ether, recovering benzene from the distillate and 2,4-dimethylpentane from the bottoms.

6. In the refining of hydrocarbons a method for separating a narrow boiling range mixture of acyclic hydrocarbons having at least 7 carbon atoms per molecule and cyclic hydrocarbons comprising subjecting a feed stock comprising a narrow boiling range mixture of hydrocarbon having at least 7 carbon atoms per molecule and a cyclic hydrocarbon to distillation in the presence of a perfluoro compound boiling within about 70° F. of the normal boiling point of the cyclic hydrocarbon to be separated, said perfluoro compound being selected from the group consisting of perfluoromethylcyclohexane, perfluorocyclohexane, perfluoro-n-heptane, perfluoro-di-n-butyl ether, perfluorotripropylamine and perfluoro-tri-n-butylamine.

7. The separation of benzene and 2,4-dimethylpentane by admixing therewith a perfluoro compound selected from the group consisting of perfluoro-methylcyclohexane, perfluoro-n-heptane and perfluoro-di-n-butyl ether and subjecting the admixture thus obtained to distillation.

8. The separation of cumene from a narrow boiling range fraction of a paraffinic alkylate containing cumene by admixing therewith a perfluoro compound selected from the group consisting of perfluorotripropylamine and perfluoro-tri-n-butylamine and subjecting the admixture thus obtained to distillation.

9. The separation of cumene from a narrow boiling range fraction of a paraffinic alkylate containing cumene by admixing therewith perfluorotripropylamine and subjecting the admixture thus obtained to distillation.

10. The separation of cumene from a narrow boiling range fraction of a paraffinic alkylate containing cumene by admixing therewith perfluoro-tri-n-butylamine and subjecting the admixture thus obtained to distillation.

11. A process for separating hydrocarbon mixtures comprising aromatic and non-aromatic components which are ordinarily not separable by simple fractional distillation which comprises azeotropically distilling said mixture in the presence of sufficient of an added perfluorocarbon selected from the group consisting of perfluoromethylcyclohexane, perfluoro-n-heptane, and perfluorocyclohexane to vaporize the aromatic component together with said perfluorocarbon as a minimum-boiling azeotropic distillate, thereby leaving the non-aromatic components of the hydrocarbon mixture as azeotropic bottoms, said perfluorocarbon being one having a normal boiling point below, but not more than about 70° F. below the boiling point of said aromatic component.

References Cited in the file of this patent

UNITED STATES PATENTS

| | | |
|---|---|---|
| 2,290,636 | Deanesly | July 21, 1942 |
| 2,348,726 | Clark | May 16, 1944 |
| 2,376,104 | Welling | May 15, 1945 |
| 2,432,771 | Lake | Dec. 16, 1947 |
| 2,442,589 | Evans et al. | June 1, 1948 |
| 2,477,303 | Lake et al. | July 26, 1949 |

OTHER REFERENCES

Nature, July 13, 1946, vol. 158, page 60.